H. CORRALL.
POWER TRANSMISSION DEVICE.
APPLICATION FILED APR. 10, 1914.
1,211,292.
Patented Jan. 2, 1917.
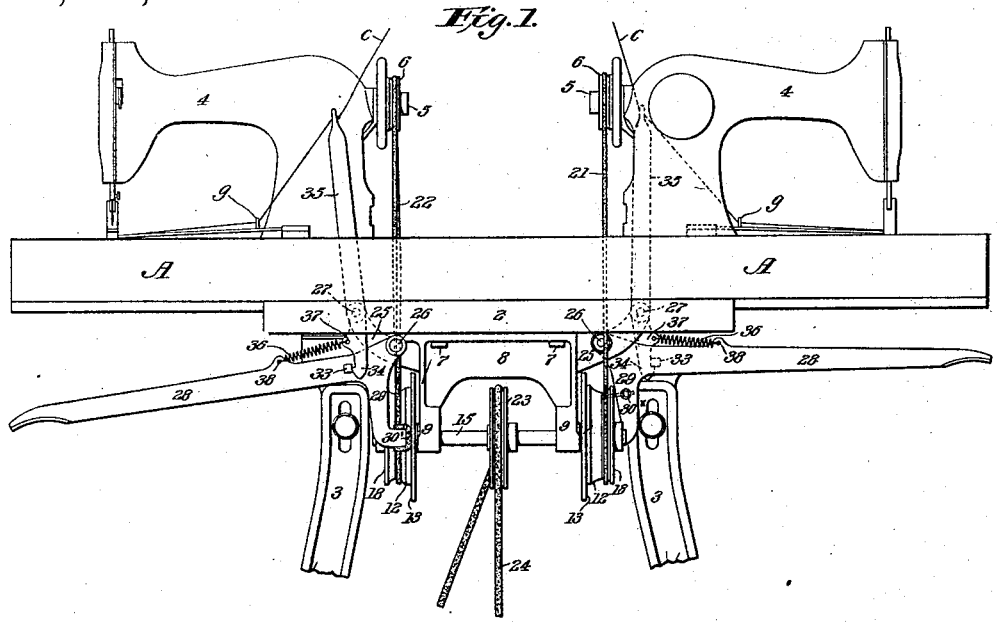
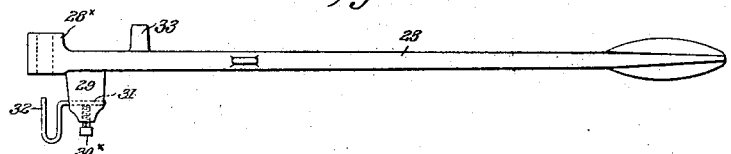
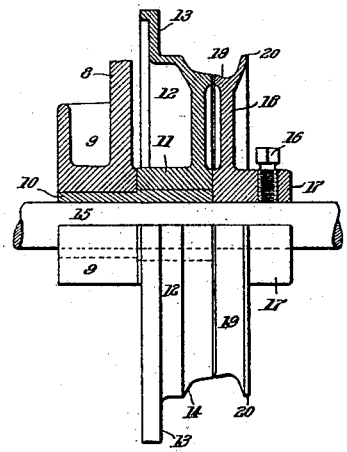
WITNESSES:
INVENTOR
Herbert Corrall
BY
Henry J. Miller
ATTORNEY

UNITED STATES PATENT OFFICE.

HERBERT CORRALL, OF HELENSBURGH, SCOTLAND, ASSIGNOR TO THE SINGER MANUFACTURING COMPANY, A CORPORATION OF NEW JERSEY.

POWER-TRANSMISSION DEVICE.

1,211,292. Specification of Letters Patent. Patented Jan. 2, 1917.

Original application filed October 19, 1912, Serial No. 726,757. Divided and this application filed April 10, 1914. Serial No. 830,862.

*To all whom it may concern:*

Be it known that I, HERBERT CORRALL, a subject of the King of the United Kingdom of Great Britain and Ireland, and residing at Parkview, Helensburgh, Dumbartonshire, Scotland, have invented certain new and useful Improvements in Power-Transmission Devices, of which the following is a specification, reference being had therein to the accompanying drawings.

This invention relates to power transmission devices, and has for its object to provide devices adapted to expedite the shifting of a driving belt from driving to idle position and vice versa, the devices being especially adapted for use in connection with high speed sewing machines as more fully disclosed in my co-pending application Serial No. 726,757, filed October 19, 1912, of which this application is a division.

In its present embodiment the invention comprises a continuously rotating shaft carried in the bearings of a hanger depending from a table or support for the machine or machines, and having a central belt-pulley and at each end a fast or driving pulley. Each driving pulley is disposed adjacent a loose or idler pulley mounted upon a bush or extension of the hanger concentric with the continuously rotating shaft. A driving belt extends through the work-table from a machine thereon to the driving and loose pulleys at one end of the rotating shaft, the belt being normally upon the loose pulley. The fast pulley and loose pulley are made each with a single flange on the outside, and the loose pulley is of slightly larger diameter than the driving pulley, its face being inclined toward the similarly inclined face of the driving pulley so that the initial tension on the belt is sufficient to roll the same sidewise onto the driving pulley as soon as the counter-resistance of a belt-fork or shipper is removed. The belt-fork is attached to a bell-crank which also serves as a brake-lever, the long arm of the lever being adapted to be lifted to shift the belt onto the driving pulley to start the machine and to be held there by a pivoted latch or trip-lever engaging a lug or projection on the lever arm. In the present instance the trip-lever extends upwardly from its pivot and terminates in an aperture through which a cord or thread passes on its way to a sewing machine, the arrangement being such that a knot or an excessively thick section in the cord will tilt the trip-lever against the resistance of a light spring and thereby will release the belt-fork lever which moves by gravity to transfer the driving belt from the fast to the loose pulley and to apply the brake so that the sewing machine is stopped.

When the sewing machine is out of action, the initial pull of the driving belt is entirely removed from the under-driving shaft, the loose pulley being mounted on a bush so that undue wear on the shaft is obviated.

In the drawings Figure 1 is an end elevation of a power bench or table provided with the present improvements. Fig. 2 is a top plan view of the shipper-lever; and Fig. 3 is an elevation, partly in section, of a portion of the hanger and the fast and loose pulleys sustained thereby.

The power bench or table A is shown constructed with a longitudinal platform 2 mounted upon the end standard 3, the table sustaining the sewing machine heads 4 with their main-shafts 5 in substantial alinement, carrying the grooved belt-pulleys 6 at their adjacent ends. Secured to the under side of the platform 2 by means of bolts 7 is the bracket 8 with depending spaced and alined bearing bosses 9 in which are secured the oppositely extending bushings 10 affording exterior journals for the hubs 11 of the loose pulleys 12 each formed at the edge adjacent the boss 9 with the brake flange 13 and each provided adjacent the opposite edge with the conical belt-receiving face 14.

Journaled within the bushings 10 is the driving shaft 15 to which is secured adjacent the pulley hubs 11 by means of set-screws 16 the hubs 17 of the fast pulleys 18 provided with the belt-receiving faces 19 of substantially conical form or contracted in diameter from the edge adjacent the loose pulley 12 toward the opposite edge which is formed with a guard flange 20. The operative faces of the fast and loose pulleys are substantially of the same size at their adjacent edges and together form a continuous substantially conical surface inclined outwardly relative to their axis of rotation. Driving belts 21 and 22 embrace the pulley 6 of each sewing machine and either of the pulleys 12 and 18, the latter connecting the driving shaft 15 with the main-shafts of the sewing mechanism.

The shaft 15 has fixed thereon intermediate the bosses 9 the grooved belt-wheel 23 over which runs the belt 24 continuously driven by any usual or suitable means such as an electric motor.

The bracket 8 is provided with divergently and upwardly extending arms 25 sustaining the fulcrum pins 26 and 27. Upon each of the fulcrum pins is journaled at the junction of its arms the hub 28$^x$ of an angular shipper-lever constructed with a lateral actuating arm 28 and a shorter or depending shipper and brake-shoe carrying arm 29 whose extremity has a facing 30' of leather or other suitable material to afford a brake-shoe adapted to engage the outer face of the flange 13 of the loose-pulley 12. The shipper-lever is shown provided with a socket in which is secured, by means of the set-screw 30$^x$, the shank 31 of the shipper fork 32, as represented more particularly in Fig. 2.

The arm 28 of each shipper-lever is provided with a lateral lug or projection 33, forming a detent shoulder adapted for engagement by the hooked extremity 34 of the depending arm of a latch-lever 35 having a hub journaled upon one of the fulcrum pins 27, the extremity of arm 35 being flattened out and provided with a cord-guiding aperture. Each latch-lever is normally drawn into operative engagement with the lug 33 by means of a spring 36 having one end secured to an apertured ear 37 of the depending arm, of latch-lever 35 and the other similarly connected with an apertured ear 38 of the shipper-lever 28.

To start the machine in operation, the shipper-lever arm 28 is manually raised to the position shown at the right in Fig. 1, whereby the brake-shoe 30' is disengaged from the brake-flange 13 and the belt, 21 or 22, is shifted from the loose to the fast pulley being held in such position by engagement of the hooked extremity 34 of the latch-lever with the lug 33 under the action of the spring 36. In this position of the latch-lever the cord or thread $c$, led through the guide aperture therein and a suitable guide-eye $g$ upon the sewing machine bed-plate to the material being stitched, is freely drawn by the action of the stitch-forming mechanism. Upon the approach of any abnormal enlargement in the cord, such as might be produced by kink, knot or an imperfection therein, a resistance is produced which causes the latch-lever to be shifted sufficiently to disengage the member 34 from the lug 33, thereby causing the arm 28 to automatically descend by gravity, as represented at the left in Fig. 1, whereby the connecting belt, 21 or 22, is shifted over upon the loose pulley and the brake-shoe forcibly thrust against the flange 13 to stop the machine for removal of the enlargement of the cord preparatory to the continued operation of the machine. In the employment of the improvements in connection with machines other than the sewing machines represented in Fig. 1 of the drawings, it will be understood that the latch-lever 35 may be operated automatically by any suitable means, or may be operated by hand, as desired.

It will be observed that when the machine is running, with the connecting belt, 21 or 22, upon driving pulley 18, the action of the shipper in throwing the belt upon the loose pulley 12 is assisted by the centrifugal action of the belt, which tends to cause it to creep up the inclined face of the large or loose pulley. When the action of the shipper-lever is in the opposite direction, to throw the belt upon the small or driving pulley, the tendency of the tense belt to roll upon the conical face of the now stationary loose pulley, aids the shipper in performing its function. The belt therefore has a tendency to assist the action of the belt-shipper during its movement to both starting and stopping positions.

By the means just described the pull of the driving belt upon the shaft 15 is produced only when the driven machine is actually in operation, and at other times, when the belt is under slightly greater tension upon the large or normal stationary pulley, its cross strain upon the driving shaft is wholly removed therefrom and is sustained by the stationary bushing 10 of the bearing boss 9.

It has been common heretofore to ship a continuously running belt from a loose pulley or idler to a fast pulley upon a shaft to be driven; but according to the present invention the connecting belt is stationary when the driven machine is not in operation, and the wear of the parts consequent upon the lateral pull of the belt is wholly removed, not only from the shaft, but from the loose pulley which it embraces, when the driven machine is at rest.

Having thus set forth the nature of the invention, what I claim herein is:—

1. In driving devices for machines, a driving pulley and an adjacent normally-stationary idler pulley made each with a single flange on the outside, the idler pulley being of larger diameter than the driving pulley and having a belt-engaging face inclined toward a similarly-inclined face of the driving pulley, a driven pulley, a substantially round belt connecting said driving and driven pulleys, and means for shifting said belt from said driving- to said idler-pulley, thereby placing the belt under the tension.

2. A driving device for machines, comprising a driving and an idler pulley mounted for independent rotation upon a common axis and having conical faces inclined in the same direction relative to said axis and of substantially equal diameter at their adjacent edges, a belt adapted to embrace either of said pulleys, and a shipper for shifting the belt from one to the other of said pulleys.

3. A driving device for machines, comprising a driving and an idler pulley mounted for independent rotation upon a common axis and having conical faces inclined in the same direction relative to said axis, the faces of said pulleys being of substantially the same diameter at their adjacent edges and that of the driving pulley being the smaller of the two relative to the opposite edges, a belt adapted to embrace either of said pulleys, and a shipper for shifting the belt from one to the other of said pulleys.

4. A driving device for machines, comprising a hanger having a bearing boss, a driving shaft journaled in said hanger, a loose pulley journaled upon said bearing boss, a driving pulley fixed upon said shaft and having one edge of its face of substantially the same diameter as the adjacent edge of the loose pulley, a substantially round belt adapted to connect said pulleys with a machine to be driven, and a shipper for shifting the belt from one to the other of said pulleys.

5. A driving device for machines, comprising a driving and an idler pulley mounted for independent rotation upon a common axis and having conical faces inclined in the same direction relative to said axis and of substantially equal diameter at their adjacent edges, a belt adapted to connect said pulleys with a machine to be driven, a shipper for shifting the belt from one to the other of said pulleys and self-acting in a direction toward the idler pulley, and a pivotally mounted latch-lever adapted to hold the shipper in position to maintain the belt upon the driving pulley and adapted to be tripped to cause the automatic shifting of the belt upon the idler pulley.

In testimony whereof, I have signed my name to this specification in the presence of two subscribing witnesses.

HERBERT CORRALL.

Witnesses:
WALLACE CRANSTON FAIRWEATHER,
HENRY MASON.

Copies of this patent may be obtained for five cents each, by addressing the "Commissioner of Patents, Washington, D. C."